(12) United States Patent  
Kunemund

(10) Patent No.: US 7,583,129 B2  
(45) Date of Patent: Sep. 1, 2009

(54) INTEGRATED CIRCUIT AND METHOD FOR OPERATING THE INTEGRATED CIRCUIT

(75) Inventor: Thomas Kunemund, Munich (DE)

(73) Assignee: Infineon Technologies AG (DE)

( * ) Notice: Subject to any disclaimer, the term of this patent is extended or adjusted under 35 U.S.C. 154(b) by 238 days.

(21) Appl. No.: 10/857,616

(22) Filed: May 27, 2004

(65) Prior Publication Data

US 2004/0239400 A1 Dec. 2, 2004

(30) Foreign Application Priority Data

May 27, 2003 (DE) ............................... 103 24 049

(51) Int. Cl.
*H03K 17/00* (2006.01)

(52) U.S. Cl. ........................................ 327/407; 327/99

(58) Field of Classification Search ................ 327/407, 327/408, 409, 410, 411, 412, 413
See application file for complete search history.

(56) References Cited

U.S. PATENT DOCUMENTS

| 5,332,936 | A | * | 7/1994 | Nakao | 326/68 |
|---|---|---|---|---|---|
| 5,399,921 | A | | 3/1995 | Dobbelaere | |
| 5,646,558 | A | * | 7/1997 | Jamshidi | 326/106 |
| 5,706,323 | A | * | 1/1998 | Miller | 377/73 |
| 6,008,670 | A | * | 12/1999 | Pace et al. | 326/115 |
| 6,597,232 | B1 | * | 7/2003 | Burnham | 327/407 |
| 6,822,976 | B1 | * | 11/2004 | Riesenman et al. | 370/539 |
| 2003/0085747 | A1 | | 5/2003 | Hein et al. | |

FOREIGN PATENT DOCUMENTS

| DE | 100 44 837 C1 | 9/2001 |
|---|---|---|
| EP | 0 669 620 | 8/1995 |
| JP | 10-207694 | 8/1998 |
| JP | 2000-332597 | 11/2000 |
| JP | 2003-018143 | 1/2003 |
| JP | 2004-347975 | 12/2004 |
| WO | WO-99/67766 | 12/1999 |

OTHER PUBLICATIONS

Rabaéy J.; "Designing Arithmetic Building Blocks"; Digital Integrated Circuits—A Design Perspective; Prentice Hall (1996), Chapter 7, pp. 383-437.

P.E. Gronowski et al., "A 433 MHz 64-b Quad-issue RISC Microprocessor," IEEE Journal of Solid State Circuits, vol. 31, No. 11, Nov. 1996, pp. 1687-1696.

(Continued)

*Primary Examiner*—Lincoln Donovan
*Assistant Examiner*—Khareem E. Almo
(74) *Attorney, Agent, or Firm*—Dickstein, Shapiro, LLP.

(57) ABSTRACT

An integrated circuit having cascade-connected multiplexers and a precharge unit. The cascade-connected multiplexers each have a plurality of data inputs, a data output, wherein each data input and each data output has two terminals for the application of a dual-rail signal, and a control input, wherein a signal present at the control input defines which of the data inputs is connected to the data output. The precharge unit, which is driven with a precharge unit control signal, is connected to the data output or at least one of the data inputs of one of the multiplexers to thereby bring the data outputs and/or data inputs of the multiplexers into a precharge state before execution of a computation operation.

22 Claims, 12 Drawing Sheets

OTHER PUBLICATIONS

Hiroyuki Matsubara et al., "An Architecture for Secure Encryption VSLI Processors Using a Constant—characteristic Power Dissipation Concept", Journal of Information Processing Society of Japan, Apr. 15, 2001, vol. 42, No. 5, pp. 950-957.

Tiri, K., et al., "A Dynamic and Differential CMOS Logic with Signal Independent Power Consumption to Withstand Differential Power Analysis on Smart Cards," Proceedings of 28th European Solid-State Circuits Conference 2002 (ESSCIRC 2002), Sep. 24, 2002, pp. 403-206.

* cited by examiner

FIG 5 Ctrl Signal Generation

INTEGRATED CIRCUIT AND METHOD FOR OPERATING THE INTEGRATED CIRCUIT

CROSS-REFERENCE TO RELATED APPLICATION

This application claims priority to German Patent Application No. 10324049.7 filed May 27, 2003, and is incorporated herein by reference in its entirety.

FIELD OF THE INVENTION

The application relates to an integrated circuit, in particular a logarithmic shifter, and a method for operating the integrated circuit.

BACKGROUND OF THE INVENTION

Situated at the heart of the processing unit of modern microprocessors and microcontrollers, the so-called "Central Processing Unit" (CPU), is the data path, which represents the interconnection of all the functional units for processing data. The interconnection is effected via bundles of lines, so-called data buses, and comprises, inter alia, the functional units of multiplexer, arithmetic logic unit (ALU), shifter and register file. The construction and the interaction of the functional units of data paths are sufficiently known to the person skilled in the art, and so a more detailed description is dispensed with.

The shifter serves for bit manipulation i.e. for shifting a binary data word by a number n of bit positions toward the right or left, said number generally being programmable by means of control signals. By way of example, a shifter has a programmable range of values n $\in[-7, 7]$, i.e. the data word (assumed to be sufficiently wide) at the input of the shifter can be shifted by up to seven bit positions toward the right or left.

There are various forms of realization of shifters, namely the so-called barrel shifters and the logarithmic shifters. In the case of a single-stage realization of the abovementioned example with a barrel shifter which has to be able to process M=15 different shift operations (M is also referred to as the power), this requires a 1-out-of-15 multiplexer for each data bit, which multiplexer has to have a corresponding number of data and control inputs. In the case of the multistage, logarithmic realization with the logarithmic shifter, shifting e.g. by +4, 0 or −4 bits is effected in the first stage, shifting e.g. by +1, 0 or −1 bit is effected in the second stage connected downstream, and shifting e.g. by +2, 0 or −2 bits is effected in the subsequent third stage. With three cascaded 1-out-of-3 multiplexer circuits and a maximum of nine control inputs, this means a significantly more favorable solution with regard to the number of switching elements required and principally the wiring and area outlay.

It holds true, in general, that the barrel shifter is appropriate only for small values of M. For larger values of M, the logarithmic shifter is significantly more effective and more efficient both as far as the outlay is concerned and as far as the switching time is concerned. Background information in this respect can be gathered from the book "DIGITAL INTEGRATED CIRCUITS—A Design Perspective", Jan M. Rabaey, Prentice Hall (1996), Chapter 7.

Data paths of modern microprocessors and microcontrollers are usually embodied in so-called "single-rail" circuitry. In these, each bit of the information to be processed is physically represented by precisely one electrical node. Consequently, precisely one electrical node corresponds to the logic value of a state bit.

A disadvantage of this single-rail technology is the fact that the circuit construction or the signals processed in the circuit can be covertly discovered in a simple manner. One of the most important methods for attacking circuits and for assessing their sensitivity in security applications is differential power analysis (DPA). This methodology is used for targeted attacks in order to covertly discover confidential information such as, for example, passwords or cryptographic keys.

This involves evaluating power profiles measured by statistical methods for a given program or for a given algorithm. In particular, charge integrals calculated over one or more clock cycles are evaluated, in which case—for a multiplicity of program executions—conclusions about the information to be protected can be drawn from the correlation of systematic data variation and respective charge integral.

It follows from this that the integrated circuits to be protected, such as e.g. smart cards, should be configured in such a way that they yield the same power profile independently of the data to be processed, in order to cause a differential power analysis to come to nothing.

This is not the case for single-rail data paths. The charge integral assigned to the temporal profile of the states of a circuit is a function of those nodes or electrical capacitances which are subjected to electrical charge reversal. The temporal profile is thus greatly dependent on the temporal changes in the data to be processed.

One disadvantage of known shifters is that they are embodied using single-rail technology and, therefore, the data transported through them can be covertly discovered.

SUMMARY OF THE INVENTION

An object of the present invention consists, therefore, in specifying an integrated circuit, in particular a shifter, in which covertly discovering data is made more difficult. Furthermore, the intention is to specify a method for operating this integrated circuit which has a constant charge integral in order to cause a differential power analysis to come to nothing.

This object is achieved by means of an integrated circuit having the features of patent claim 1 and by means of a method having the features of patent claim 13. Advantageous refinements emerge from the respective dependent claims.

The circuit according to the invention has the following features:

- at least two cascade-connected multiplexers, which each have a plurality of data inputs, a data output and a control input, the signal present at the control input defining which of the data inputs is connected to the data output,
- the data output of a multiplexer is connected to one of the data inputs of the multiplexer connected downstream, as a result of which a data path leading through the cascade is formed,
- each data input and each data output has two terminals for the application of a dual-rail signal, and
- at least one precharge unit that can be driven with a control signal is provided, which is connected to the data output or the data input of one of the multiplexers, which can bring the data outputs and/or data inputs of the multiplexers into a precharge state before the execution of a computation operation.

The invention is based on the concept that changing charge integrals can be prevented by the use of so-called dual-rail technology. In contrast to conventional single-rail technology, in which each bit within a data or signal path is physically represented by precisely one electrical node k of a switching network or switching mechanism, in the realization with dual-rail technology each bit is represented by two nodes k and kq, said bit having a valid logic value if k corresponds to the true logic value b of said bit and kq corresponds to the complementary value bn=not (b).

The desired invariance of the charge integrals is now achieved by virtue of the fact that a so-called precharge state is inserted between two states with valid logic values (b, bn)=(1, 0) or (0, 1). In said precharge state, both the node k and the node kq are charged to the same electrical potential, that is to say assume logically invalid values (1, 1) or (0, 0). For the precharge state (1, 1), a state sequence might appear as follows:

(1, 1), (0, 1), (1, 1), (1, 0), (1, 1), (1, 0), (1, 1), (0, 1)

It holds true for any of such state sequences that precisely one node is subjected to charge reversal from 1 to 0 in the case of each (1, 1) to (b, bn) transition and precisely one node is subjected to charge reversal from 0 to 1 for all (b, bn) to (1, 1) states. This holds true independently of the logically valid value b of a respective state bit. The same also applies analogously, of course, to state sequences with the precharge state (0, 0).

It follows from this that the charge integrals corresponding to these state sequences are independent of the sequence (b, bn) of the logically valid values. It is necessary merely to ensure that the nodes k and kq have identical electrical capacitances. The power profile of a data path implemented in this way thus no longer depends on temporal variations of the data to be processed. A circuit constructed using dual-rail technology is thus resistant to a differential power analysis.

The invention is thus based on the idea of applying, during the operation of the integrated circuit, a precharge signal to the data inputs and data outputs in the data path of the multiplexer cascade before the execution of a computation step, in particular a shift operation.

In one preferred refinement, the precharge unit is connected between a supply potential terminal or a reference potential terminal and the data path of the integrated circuit. Whether a connection is made to the supply potential terminal or the reference potential terminal depends on the type of transistors used. By way of example, when p-channel transistors are used, the precharge unit is connected to the supply potential terminal.

In a further refinement, the precharge unit is connected to the data output of the last multiplexer of the cascade, which simultaneously represents the data output of the integrated circuit. In the case of this variant, it is possible to precharge the internal nodes of the multiplexer cascade, which are formed by the connection of the data output of a multiplexer to the data input of the multiplexer connected downstream, by precharge units arranged at the data output of the integrated circuit. This is done by applying control signals to all further multiplexers with the exception of the first multiplexer of the cascade, so that a conductive connection of the data input to the data output is produced in the case of these multiplexers. Preferably, in the case of this variant, a precharge signal is applied to the data input of the first multiplexer of the cascade by a precharge unit connected thereto.

In a further preferred refinement, the precharge unit is connected to the data input of the first multiplexer of the cascade which represents the data input of the integrated circuit. In the case of this variant, it is possible to apply a precharge signal to the internal nodes of the multiplexer cascade from the data input of the circuit. This is done by applying control signals to all other multiplexers with the exception of the last multiplexer of the cascade, so that a conductive connection of the data input to the data output is produced in the case of these multiplexers. In this case, preferably, a precharge signal is applied to the data output of the last multiplexer of the cascade by a precharge unit connected thereto.

In a further refinement, the precharge unit is connected between the data output of one of the multiplexers and the data input of a multiplexer connected downstream. This means nothing more than that the precharge unit is connected to an internal node of the multiplexer cascade. By analogy with the procedure described above, control signals are applied to the multiplexers in this case, too, so that a precharge signal can be applied to the data path of the multiplexer cascade. It is conceivable to provide in each case a further precharge unit at the data input and data output of the integrated circuit, which precharge unit provides the respective nodes of the data path with the precharge signal.

In a further preferred refinement, a holding circuit coupled to the data path is provided, which, in the case of a dual-rail signal present at the data output of a multiplexer, connects the respective signal value to the supply potential terminal or the reference potential terminal. The holding circuit ensures that, as soon as one of the signals of the dual-rail signal has been brought to low potential, the respectively complementary node is held at high potential. The holding circuit is self-regulating in this case.

Preferably, the holding circuit is connected to the precharge unit. It is further preferred for the holding circuit to be arranged at the data output of the integrated circuit. In one refinement, it has two cross-coupled transistors and is connected between the data output of the circuit and the supply potential terminal or reference potential terminal.

In a further refinement, a drive circuit connected to the multiplexers and the precharge unit is provided, which performs the temporal synchronization of the control signals of the multiplexers and the control signal of the precharge unit. The method of operation of this drive circuit will become evident from the method for operating the integrated circuit that is described in more detail below.

In accordance with the concept of the invention, a precharge signal is intended to be applied to the data inputs and data outputs in the data path of the multiplexer cascade before the execution of a computation step, in particular a shift operation.

For application of a precharge signal, it is provided that, in a first phase, control signals are applied to all the multiplexers of the cascade, so that no conductive connection exists between data input and data output of a respective multiplexer, and a control signal is applied to the precharge unit, so that that section of the data path which is connected thereto is brought into a precharge state. This procedure initially constitutes nothing more than the activation of the precharge unit.

In a second phase, control signals are applied to at least some of the multiplexers, so that a conductive connection of the data input to the data output is produced in the case of these multiplexers as a result of which further sections of the data path are brought into a precharge state. In this case, it is possible to apply to all the multiplexers of the cascade a control signal such that the respective data input is connected to the data output. However, it is also conceivable for only some multiplexers, preferably multiplexers arranged adjacent, to be driven in the sense described above.

In a third phase, control signals are applied to all the multiplexers of the cascade, so that a conductive connection no longer exists between data input and data output of a respective multiplexer and a control signal that deactivates the precharge unit is applied to the latter. The precharge states present on respective data lines are thus only held capacitively.

After the termination of the precharge phase, for the execution of the computation step, in the third phase, a control signal required for the computation operation is applied to the first multiplexer of the cascade.

Furthermore, for the execution of the computation step, in a fourth phase, it is provided that a control signal required for the computation operation is applied to the further multiplexers of the cascade.

After the conclusion of the computation operation, a precharge signal is once again applied to the data path according to the procedure described above, before the next computation operation is executed.

The method according to the invention for operating the integrated circuit thus enables a charge-neutral operation, as a result of which it is no longer possible to covertly discover data or computation operations by means of differential power analysis. This phase sequence not only provides for charge neutrality in the data path but also means that the charge integral corresponding to the control signal sequence is invariant, as is explained below.

A signal burst having three signals is provided for driving a multiplexer. Whether a shift operation toward to the left, toward the right or by zero will be performed is defined depending on which of the signals of a signal burst is active. Of the three respective signals within the signal bursts, in the case of the first multiplexer of the cascade connected to the data inputs, precisely one is discharged from supply potential to reference potential, precisely one is charged from reference potential to supply potential, while of all the remaining drive signals of the remaining multiplexers, precisely one is discharged with the beginning of the first phase, precisely one is charged and discharged again with the beginning of the second and third phase, respectively, and, finally, precisely one is charged in the fourth phase. This results in the invariance of the charge integral also of the control signals, provided that care is taken to ensure that the respective three nodes corresponding to the signal bursts have identical electrical capacitances.

BRIEF DESCRIPTION OF THE DRAWINGS

Further features, advantages and expediencies emerge from the figures described below, in which.

DETAILED DESCRIPTION OF THE PREFERRED MODE OF THE INVENTION

Unless expressly mentioned otherwise, identical features have been provided with identical reference symbols in all the figures.

The invention is described below on the basis of a logarithmic shifter with integer range of values for the programmable shifting of binary data words. In this case, recourse is had to the example already presented further above with a programmable range of values of $n \in [-7,7]$. This means that the data word—assumed to be sufficiently wide—at the input of the logarithmic shifter is intended to be able to be shifted by up to seven bit positions toward the left or right.

Figure 1A:
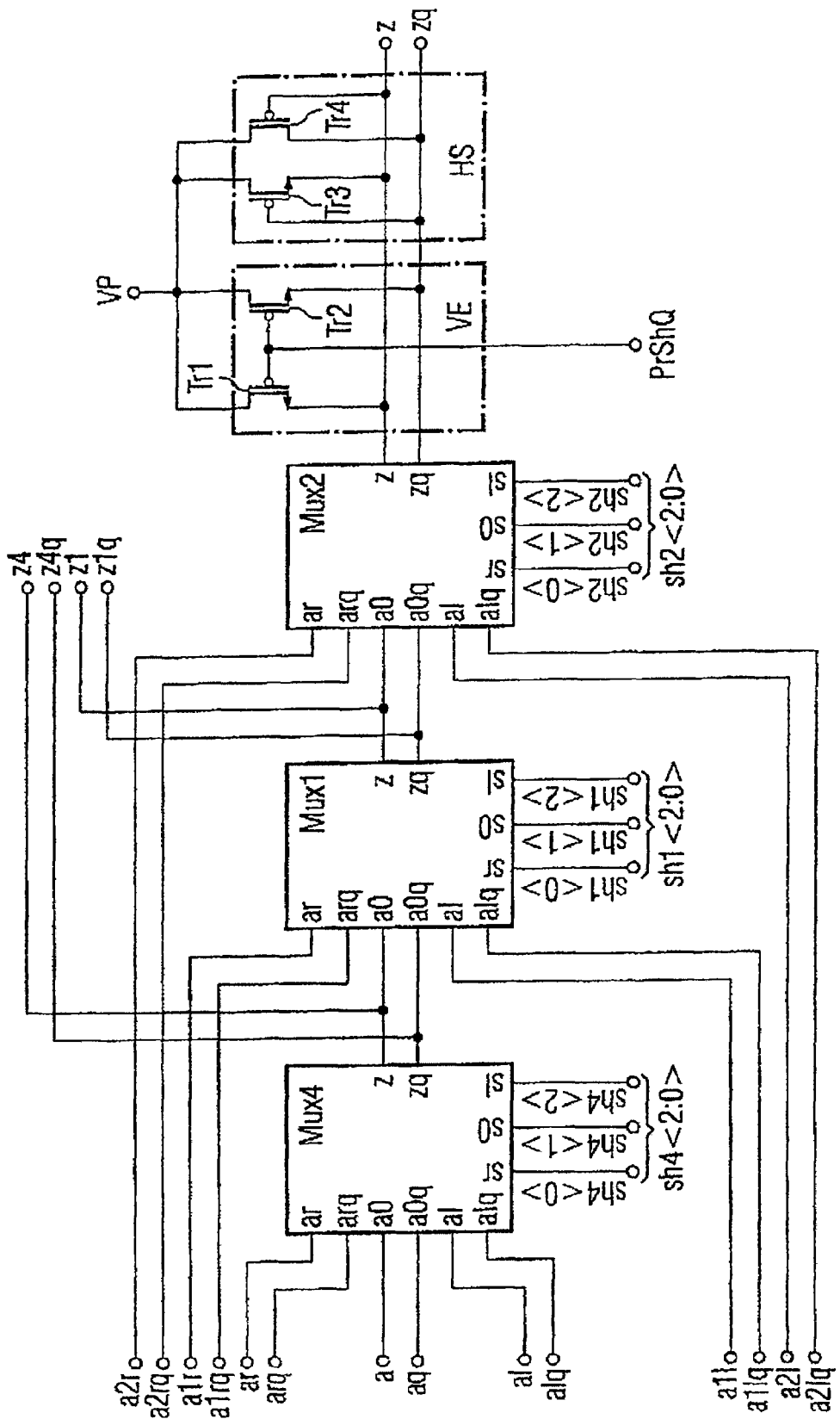
FIG. 1A shows one embodiment of a basic circuit diagram of a logarithmic shifter according to the invention with a cascade comprising three multiplexers.

FIG. 1A illustrates a three-stage multiplexer cascade for one bit of the data path (also referred to as the "bit slice"). Each multiplexer has three data inputs, a data output and three control inputs. Each data input and each data output has two terminals for the application of a dual-rail signal. The data inputs are designated by (ar, arq), (a0, a0q) and (a1, a1q) in matching fashion. The data outputs are designated by (z, zq), while the control inputs are provided with the designations (sr, s0, s1).

A signal (a, aq), (a1, a1q), (ar, arq) and (ajr, ajrq), (aj1, aj1q) where j=1, 2 can be applied to each of the data inputs of the multiplexers Mux4, Mux1, Mux2.

The first stage of the cascade is formed by the multiplexer Mux4, the data output (z, zq) of which is connected to the data input (a0, a0q) of the multiplexer Mux1 connected downstream. A multiplexer Mux2 is in turn connected downstream of said multiplexer Mux1. The data input (a0, a0q) of the multiplexer Mux2 is correspondingly connected to the data output (z, zq) of the multiplexer Mux1. The data inputs of the multiplexer Mux4 form the data input of the integrated circuit. The data output (z, zq) of the multiplexer Mux2 forms the data output of the integrated circuit.

Three control signals shj<2:0> where j=1, 2, 4 can be applied to each control input of the multiplexers Mux1, Mux2, Mux4, thereby defining which data input is connected to the data output. In this case, the place marker j is representative of the respective multiplexer Mux1, Mux2 or Mux4. If an active control signal shj<0> is applied to the control input sr, then the data input (ar, arq) is connected to the data output (z, zq).

In a corresponding manner, the data input (a0, a0q) or (a1, a1q) is connected to the data output (z, zq) if an active control signal shj<1> is applied to the control input s0 or s1, respectively.

In the first stage of the cascade, the multiplexer Mux4, the bit present at the data inputs is shifted by +4, 0 or −4 positions, and, in the second stage (multiplexer Mux1) connected downstream, the bit present at the data inputs is shifted by +1, 0 or −1 position and, in the subsequent, third stage (multiplexer Mux2), the bit present at the data inputs is shifted by +2, 0 or −2 positions. The shifting is dependent on which of the three respective control signals shj<2:0>, j=4, 1, 2 has been activated.

A precharge unit VE and a holding circuit HS are furthermore connected to the data output of the integrated circuit in FIG. 1.

The precharge unit VE comprises two p-channel transistors, the control terminals of which are connected to one another, it being possible to apply a signal PrShQ to said control terminals. The main terminals of the transistor Tr1 are connected between a supply potential terminal VP and the data output z of the integrated circuit. The main terminals of the other transistor Tr2 are connected between a supply potential terminal VP and the data output zq of the integrated circuit. The data output of the integrated circuit can be provided with a precharge signal (1, 1) by the precharge unit VE.

The holding circuit HS, having two transistors Tr3, Tr4, likewise of the p-conducting type, serves, in the case of a valid dual-rail signal (0, 1) or (1, 0), to connect the respective data outputs (z, zq) to the corresponding potential VP and to hold them.

Figure 1B:
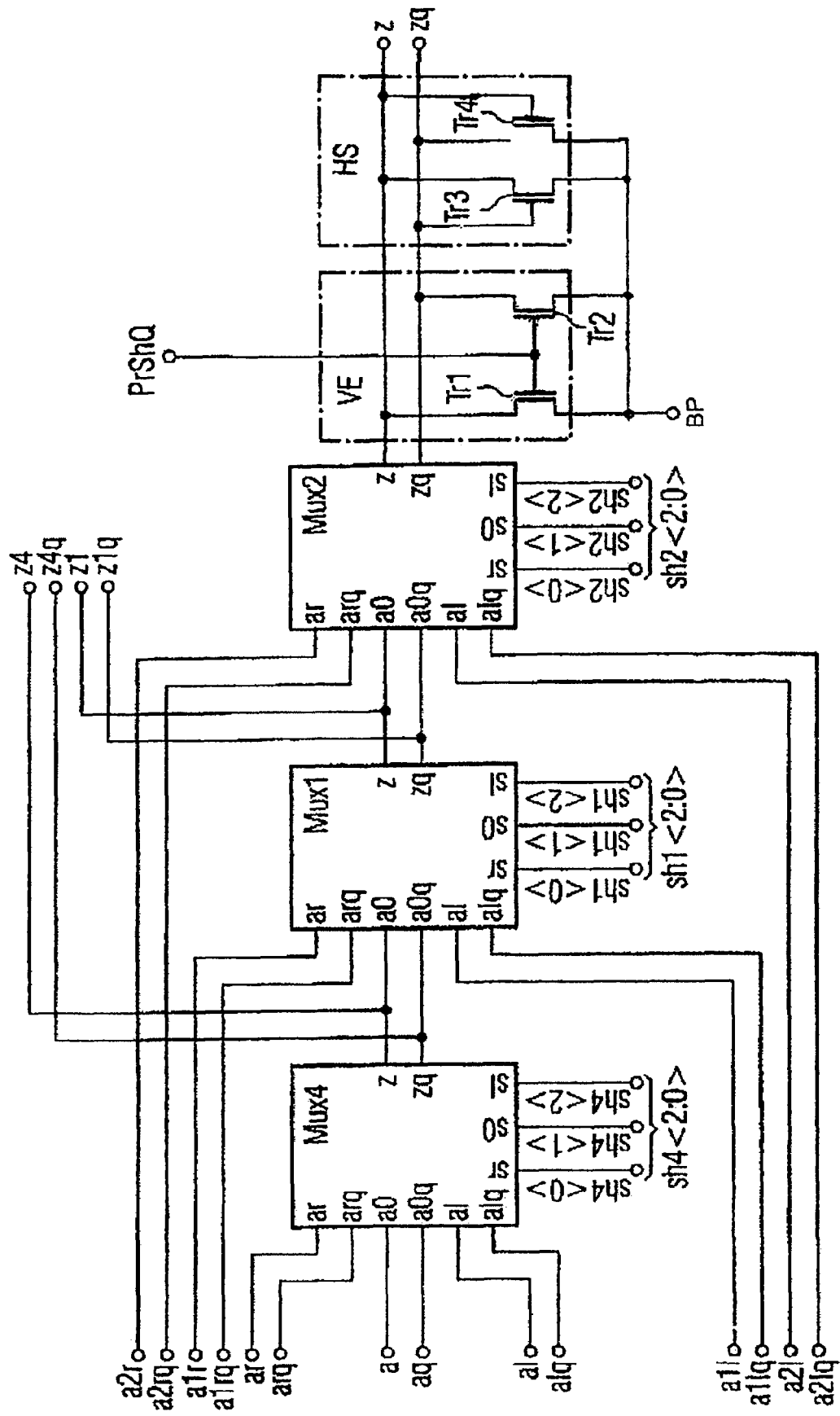
FIG. 1B shows another embodiment of a basic circuit diagram of a logarithmic shifter according to the invention with a cascade comprising three multiplexers.

FIG. 1B illustrates a three-stage multiplexer cascade wherein the precharge unit VE and the holding circuit HS could also be connected to the reference potential BP if the transistors of the precharge unit VE and of the holding circuit HS were formed with n-conducting transistors.

It should again be mentioned that the logarithmic shifter illustrated in FIG. 1A, is merely by way of example. The cascade could have more or fewer multiplexers. Equally, the bit could be shifted merely by one position in the first stage of the cascade, by two positions, for example, in the second stage and by four positions in the third stage. The arrangement is at the discretion of the person skilled in the art.

Figure 2:
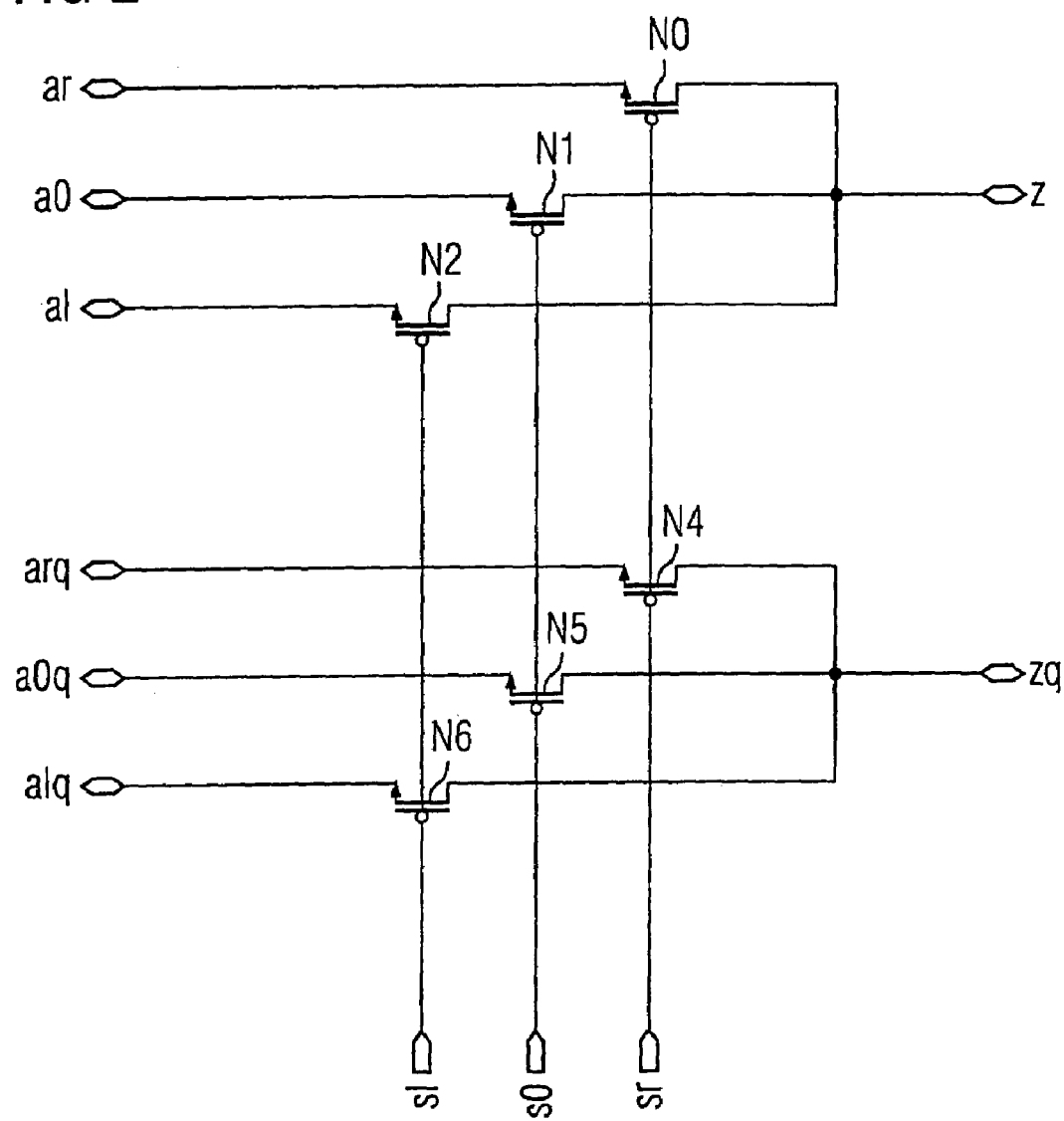
FIG. 2 shows the circuitry construction of the multiplexers illustrated in FIG. 1.

FIG. 2 shows a possible realization of the multiplexers Mux1, Mux2, Mux4. Each multiplexer is formed from six transistors N0, N1, N2, N4, N5, N6. The load paths of these transistors are respectively connected between a data input (ar, arq), (a0, a0q), (a1, a1q) and the data output (z, zq). The control terminals of two respective transistors connected to one of the abovementioned inputs are connected to the control input (s1, s0, sr). The interconnection shown is also known by the name pass-transistor circuitry.

It is directly apparent from the circuit arrangement shown in FIG. 2 that only a maximum of one of the control inputs (s1, s0, sr) is ever permitted to be active at a specific point in time, while the other two control inputs must be deactivated, so that the corresponding transistors assigned to them are turned off. The correct functioning of the circuit would otherwise by jeopardized.

In FIG. 1A, the first stage, the multiplexer Mux4, is connected to data inputs (ar, arq), (a, aq), and (a1, a1q), where (a, aq) denotes the bit corresponding to the currently considered slice in the data path directly upstream of the shifter. By analogy, (ar, arq) and (a1, a1q) denote those bits in the data path directly upstream of the multiplexer which are four bit positions higher and lower, respectively, than the currently considered bit slice. It follows from this that:

Control signal s4<2:0>=010: shifting by 0 bit positions. (a, aq) is conductively connected to the data output (z, zq) of the multiplexer Mux4 via the transistors N1, N5 (FIG. 2), Control signal S4<2:0>=001: shifting by −4 bit positions. (ar, arq) is conductively connected to the data output (z, zq) of the multiplexer Mux4 via the transistors N0, N4 (FIG. 2).

Control signal S4<2:0>=100: shifting by +4 bit positions. (a1, a1q) is conductively connected to the data output (z, zq) of the multiplexer Mux4 via the transistors N2, N6 (FIG. 2).

The same applies analogously to the multiplexers Mux1 and Mux2, (ajr, ajrq) and (aj1, aj1q) where j=1, 2 designating those bits in the data path directly upstream of the multiplexer which are j bit positions higher and lower, respectively, than the currently considered bit slice.

Figure 3:
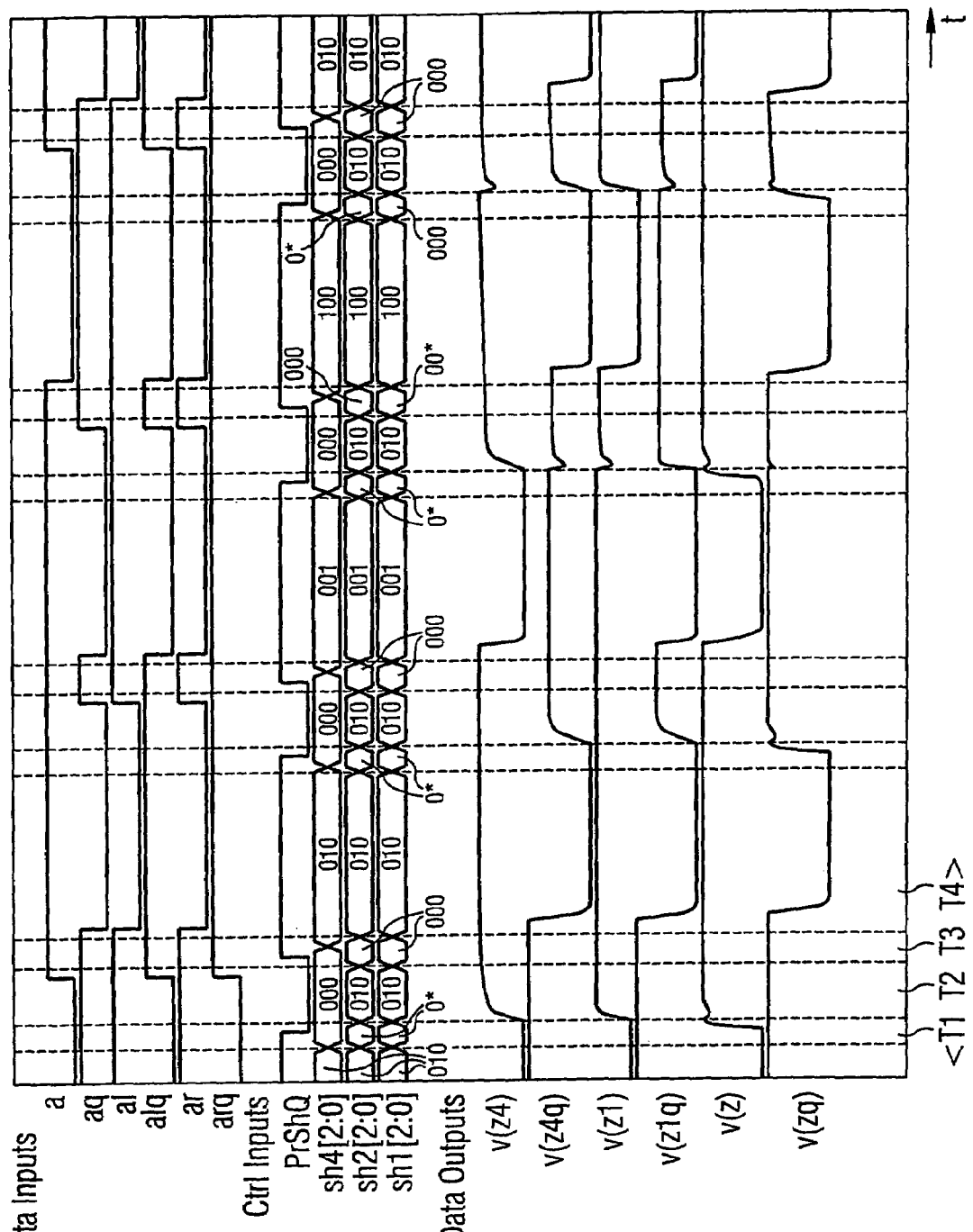
FIG. 3 shows the temporal behavior of the data signals and drive signals of the circuit from FIG. 1A.

FIG. 3 specifies the temporal sequence according to the invention of the data inputs and control signals of the logarithmic shifter from FIG. 1. FIGS. 4 to 11 elucidate the principles which have to be satisfied by circuits for generating the control signals shj<2:0> and PrShQ with the necessary and advantageous time behavior.

As can be seen in FIG. 3, each operation cycle of the logarithmic shifter comprises four successive phases T1, T2, T3 and T4, and is designated by <T1, T2, T3, T4> in FIG. 3.

With the beginning of the first phase T1, all the control signals shj<2:0>, j=1, 2, 4 present at the multiplexers Mux1, Mux2, Mux4 are inactive; this means: shj<2:0>=000. Thus, all the transistors N0 . . . N6 (FIG. 2) of each of the multiplexers Mux1, Mux2, Mux4 of the cascade are turned off. Moreover, during the phase T1, the control signal PrShQ for the precharge unit VE at the data output of the integrated circuit becomes active: PrShQ=0. Thus, the data output (z, zq) of the integrated circuit is precharged to the reference potential VDD, in other words has a precharge signal (1, 1) applied to it.

With the beginning of the second phase T2, the control signals of the multiplexers Mux1, Mux2 are programmed to shj<2:0>, j=010, j=1, 2. The multiplexer connected to the data inputs (ar, arq), (a, aq) and (a1, a1q), which forms the first stage of the cascade, thus remains turned off, while all the remaining multiplexers are programmed to "shifting by zero". Thus, all the nodes present within the multiplexer cascade (which are formed by the connection of the data output of a multiplexer to the data input of the multiplexer connected downstream (here these are (z4, z4Q) and (z1, z1q)) can be precharged from the data output of the integrated circuit. The precharge unit VE at the output of the cascade remains active with PrShQ=0. The potential reached amounts to VDD−Vth, where Vth is the threshold voltage of the n-channel transistors in the multiplexers Mux1, Mux2.

With the beginning of the third phase T3, firstly all the control signals shj<2:0>, j=4, 2, 1 of the multiplexers Mux1, Mux2, Mux4 become or remain inactive: shj<2:0>, j=000. Thus, all the transistors N0 . . . N6 of each of the multiplexers Mux1, Mux2, Mux4 are turned off. Moreover, during T3, the control signal PrShQ for the precharge unit VE at the output of the logarithmic shifter becomes inactive: PrShQ=1. The data output (z, zq) is thus isolated from the reference potential VDD.

Following this, the actual shift operation is initiated. For this purpose, firstly the control signals s4<2:0> of the multiplexer Mux4 connected to the data inputs (ar, arq), (a, aq) and (a1, a1q) are switched to the desired value. By way of example, for the first operation cycle illustrated in FIG. 3, s4<2:0>=010, i.e. the multiplexer Mux4 "shifts by zero", while shifting is effected by four positions toward the right in the second operation cycle with s4<2:0>=001 and by four positions toward the left in the third cycle with s4<2:0>=100.

Finally, with the beginning of the phase T4, all the remaining multiplexers Mux1, Mux2 of the cascade are also switched to the desired values by means of suitable control signals sk<2:0>, k=1, 2.

Thus, shifting by zero is effected in the first operation cycle illustrated in FIG. 3, shifting by a total of seven bit positions toward the right is effected in the second operation cycle and shifting by seven bit positions toward the left is effected in the third operation cycle.

This above-described phase sequence in <T1, T2, T3, T4> now not only provides for charge neutrality in the dual-rail data path of the logarithmic shifter but also means that the charge integral corresponding to the control signal sequence is invariant. This is because, of the three respective signals within the signal bursts shj<2:0>, in the case of the multiplexer Mux4 connected to the data inputs (ar, arq), (a, aq) and (a1, a1q), precisely one of the control signals s4<2:0> is discharged from supply potential VDD to reference potential VSS and precisely one (the same or another) is charged from reference potential VSS to supply potential VDD. Of all the remaining control signals shj<2:0> where j=1, 2, with the beginning of the phase T1, precisely one is discharged, namely the one which had previously been charged in the phase T4 in the cycle. With the beginning of the phase T2 and T3, shj<1> is always charged and discharged again, and, finally, precisely one of the control signals is charged in phase T4. The invariance of the charge integral of the control signals follows directly from this. However, care must be taken that the three respective nodes corresponding to the signals shj<2:0> have identical capacitances.

In the exemplary embodiment described, the transistors in N0 . . . N6 of the multiplexer Mux4 forming the first stage of the cascade are turned off during the phases T1 up to a point within T3, i.e. its data inputs are electrically insulated from the rest of the data path. These data inputs can be precharged with a precharge signal by precharge units (not illustrated in FIG. 1) outside the logarithmic shifter. This is therefore effected independently of the precharging of all the remaining nodes by the precharge unit VE illustrated in FIG. 1. Furthermore, this configuration enables to the data inputs of the multiplexer Mux4 to already assume a new, valid dual-rail signal without conflicting with the precharge operation of the remaining multiplexers Mux1, Mux2, provided that the precharge operation has been concluded temporally before that of the data output of the integrated circuit (i.e. in the phase T2). This enables an independence of the control logic of the drive circuit AS which drives the elements of the integrated circuit in a suitable manner.

In comparison with this possible temporal sequence of control signals for the logarithmic shifters, the following further alternatives are also conceivable:

The data inputs of the first stage of the multiplexer cascade are also precharged by a precharge unit at the data output, i.e. the control signals for the multiplexer which represent the first stage have the same time behavior as all the others. This means that all shj<2:0> have the same time behavior. The application to the data input of the first multiplexer (Mux4 in FIG. 1) is permitted to be switched on only when the precharge operation of the data path is concluded, in order to avoid short-circuit currents.

This also holds true in the further variants in which the internal nodes of the multiplexer cascade are precharged from the data output and from the data input of the integrated circuit.

It is also conceivable to precharge the internal nodes of the cascade and also the data output of the integrated circuit from the data input of the integrated circuit.

The precharging of the internal and external nodes of the multiplexer cascade may also be supported by a precharge unit at least one of the internal nodes that is to say a precharge unit arranged between two multiplexers.

Figure 4:
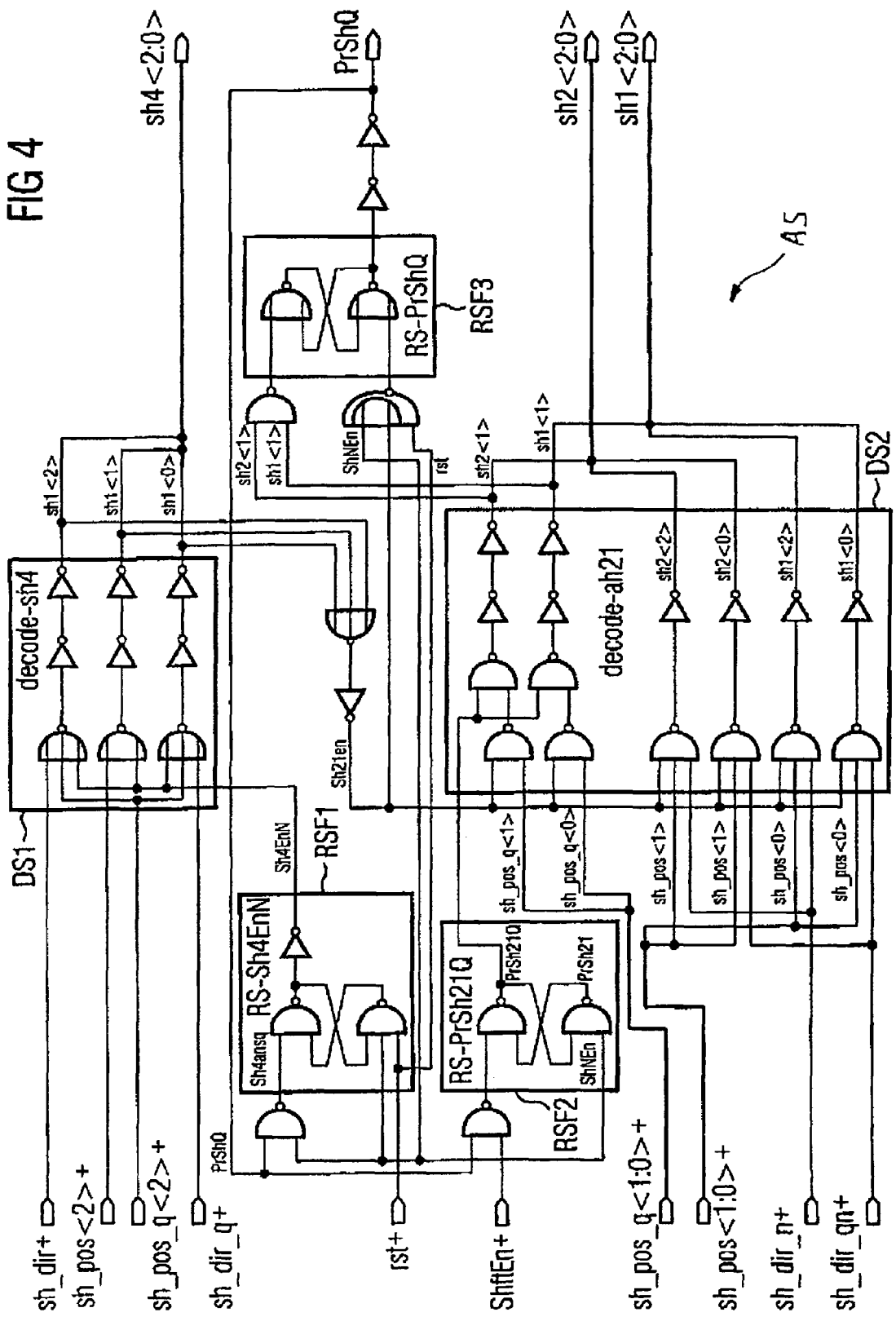
FIG. 4 shows an example of a circuitry realization for generating the drive signals of the multiplexer cascade and a precharge unit.
Figure 5:
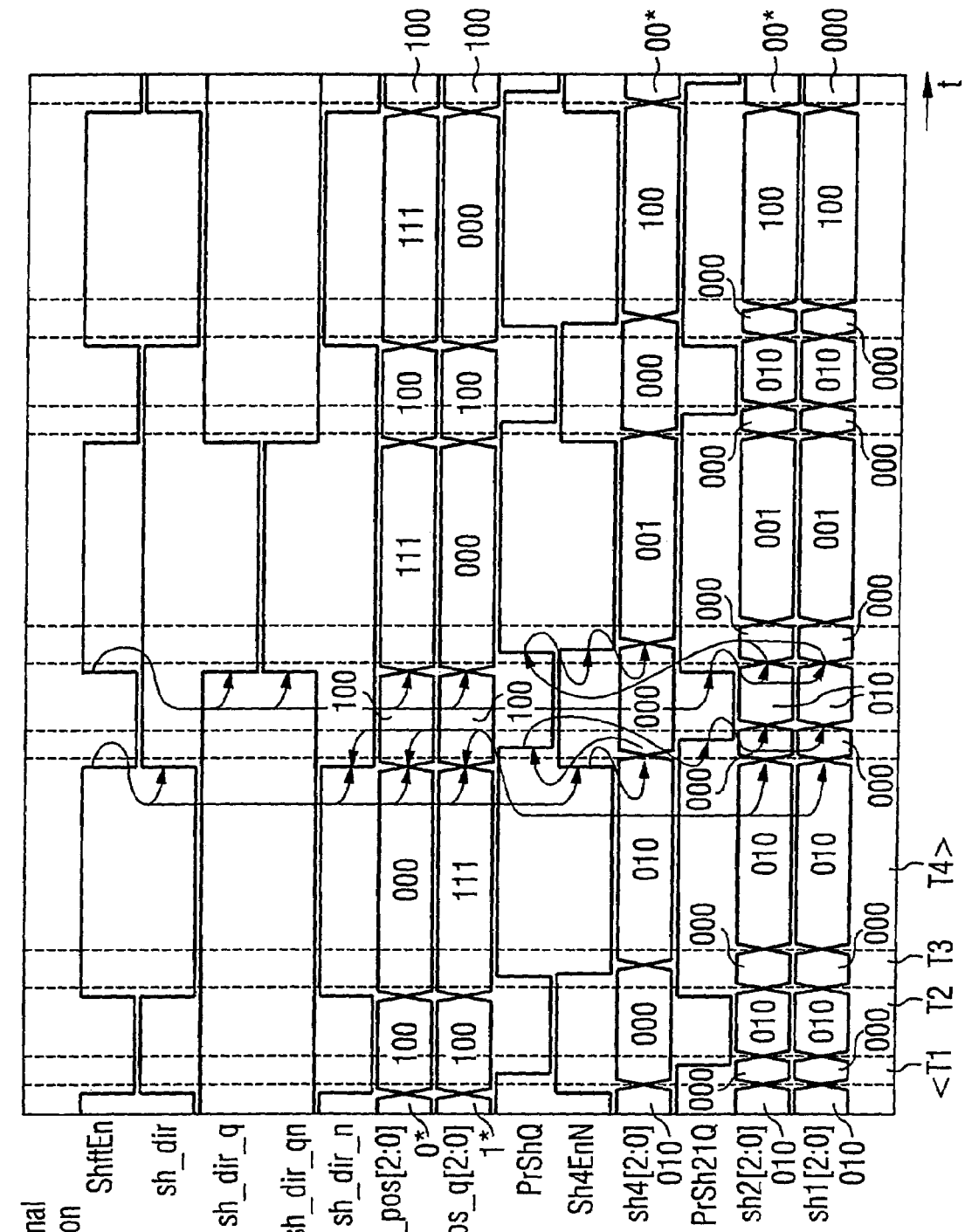
FIG. 5 shows the temporal behavior of relevant signals from FIG. 4.
Figure 6:
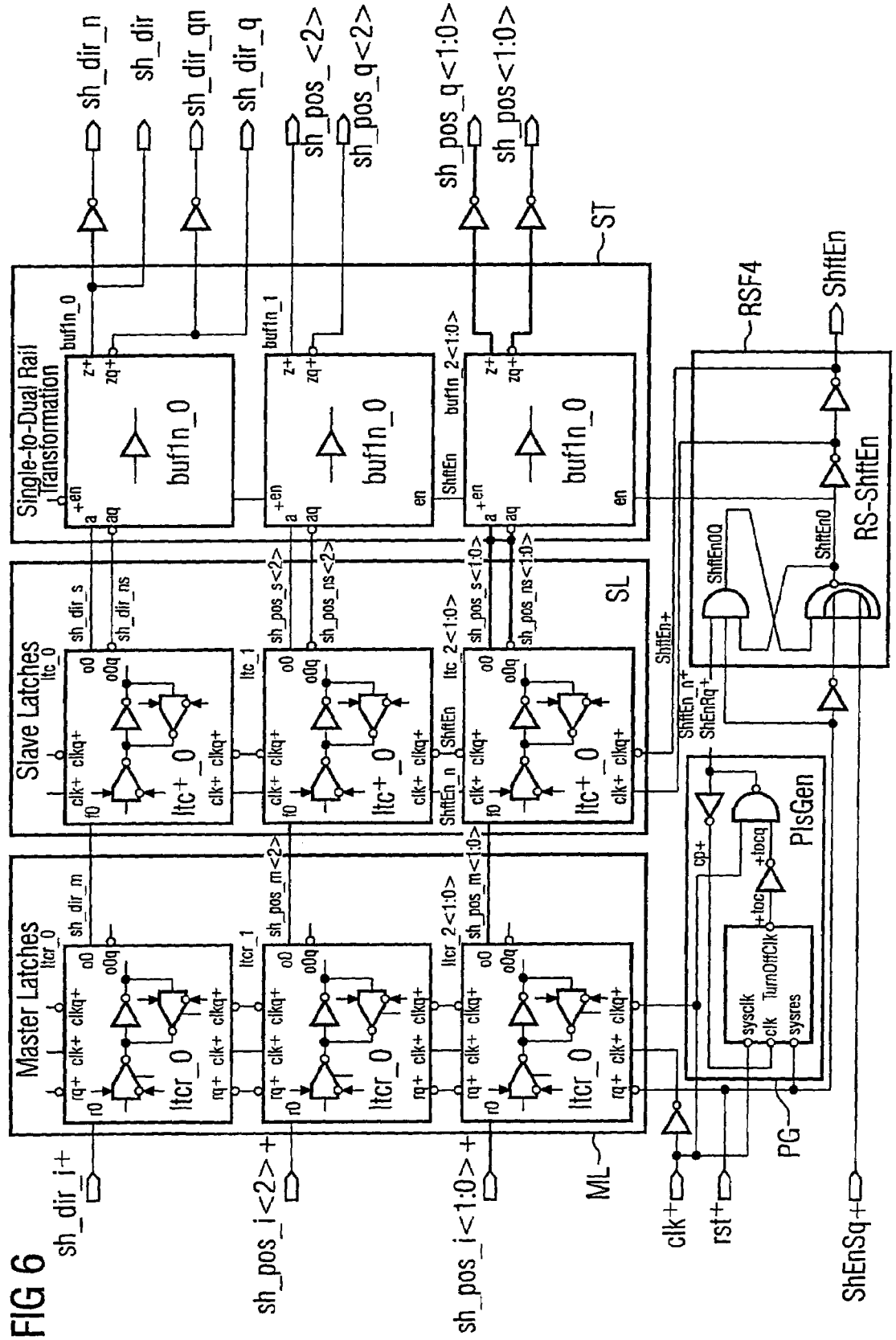
FIG. 6 shows a further partial region of the drive circuit for generating the control signals of the logarithmic shifter according to the invention from FIG. 1A, FIGS. 7 and 8 show the temporal behavior of relevant signals of the circuit arrangement from FIG. 6.
Figure 7:
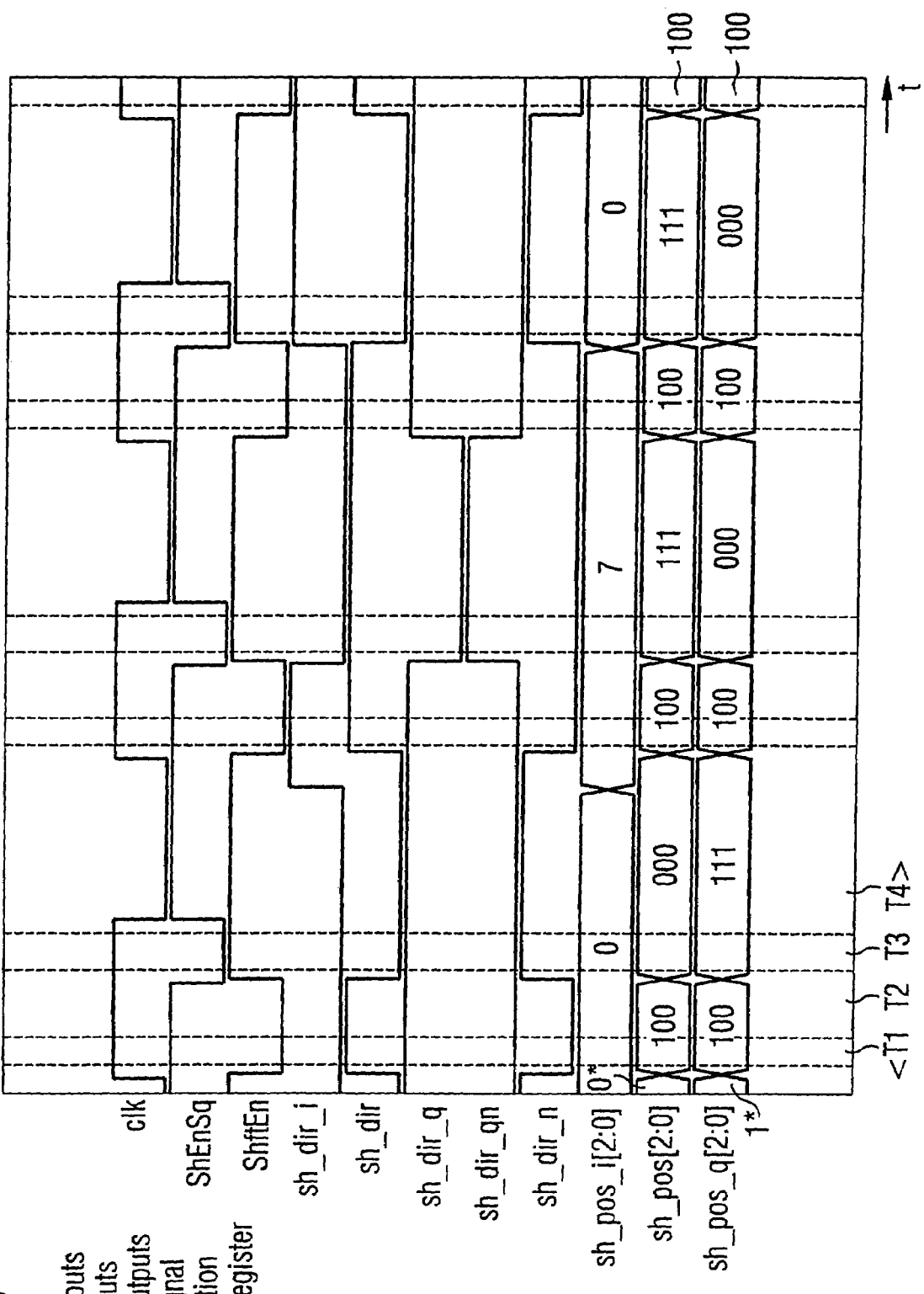
Figure 8:
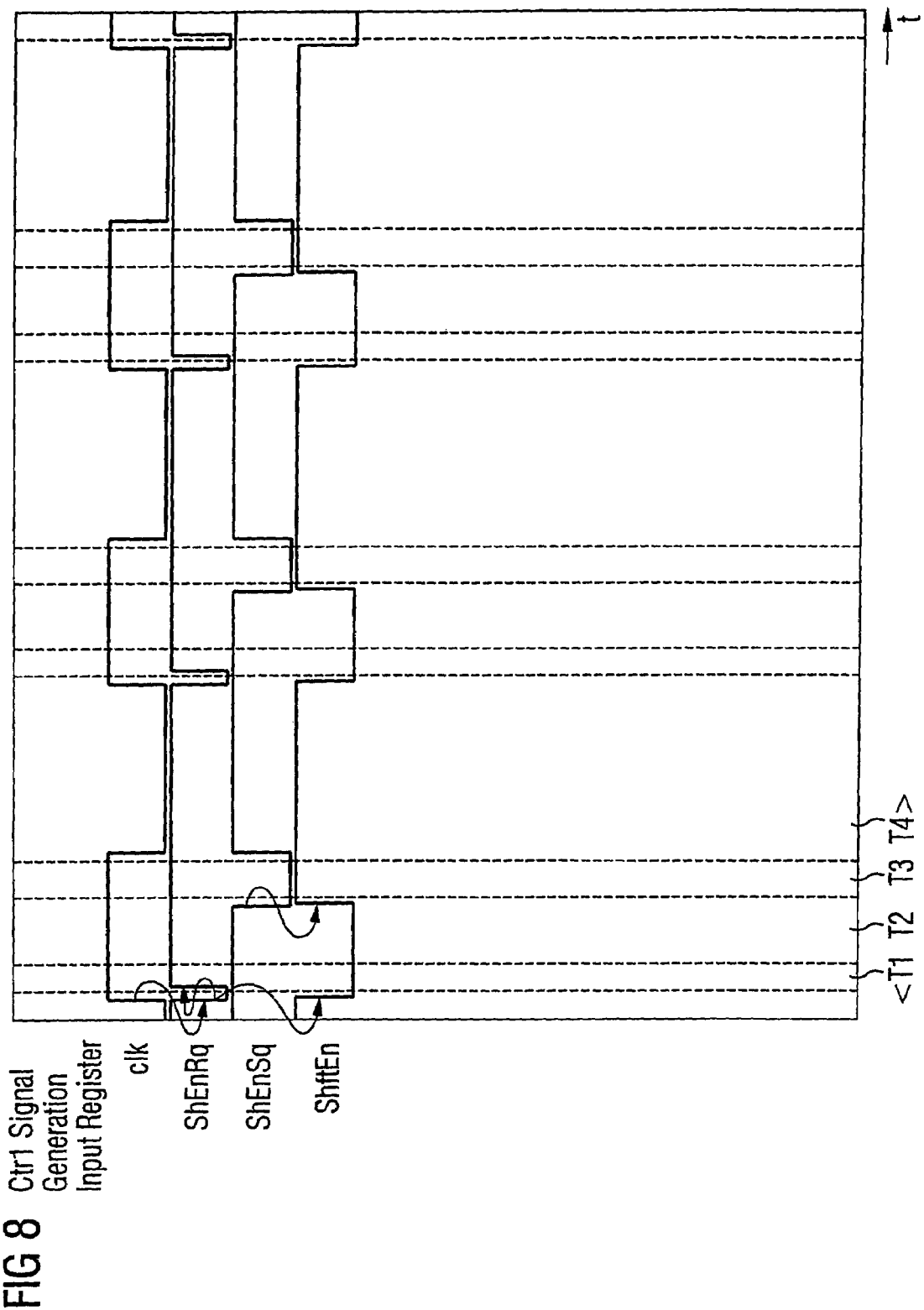
Figure 9:
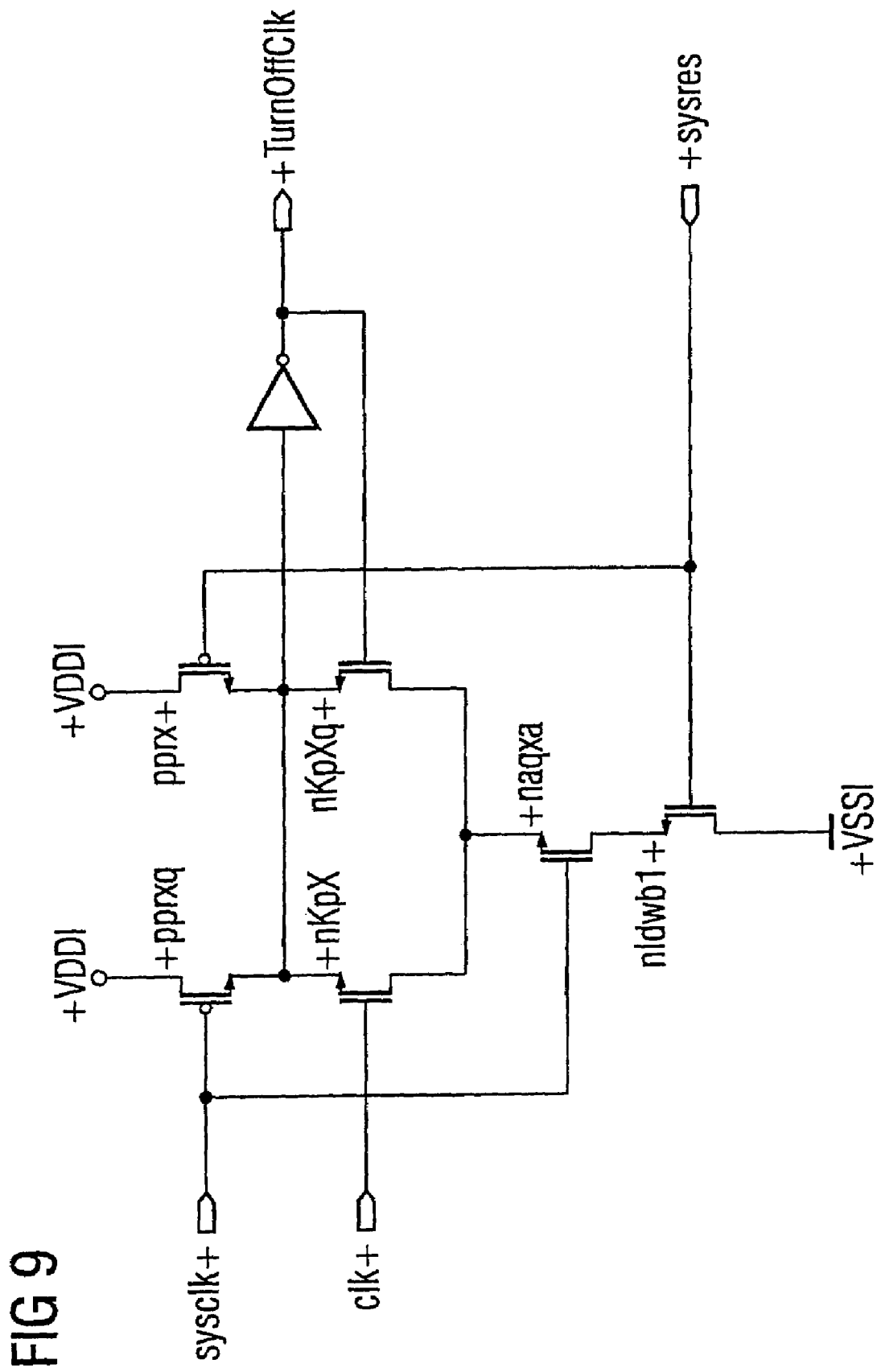
FIG. 9 shows a possible circuitry realization of the pulse generator from FIG. 6.
Figure 10:
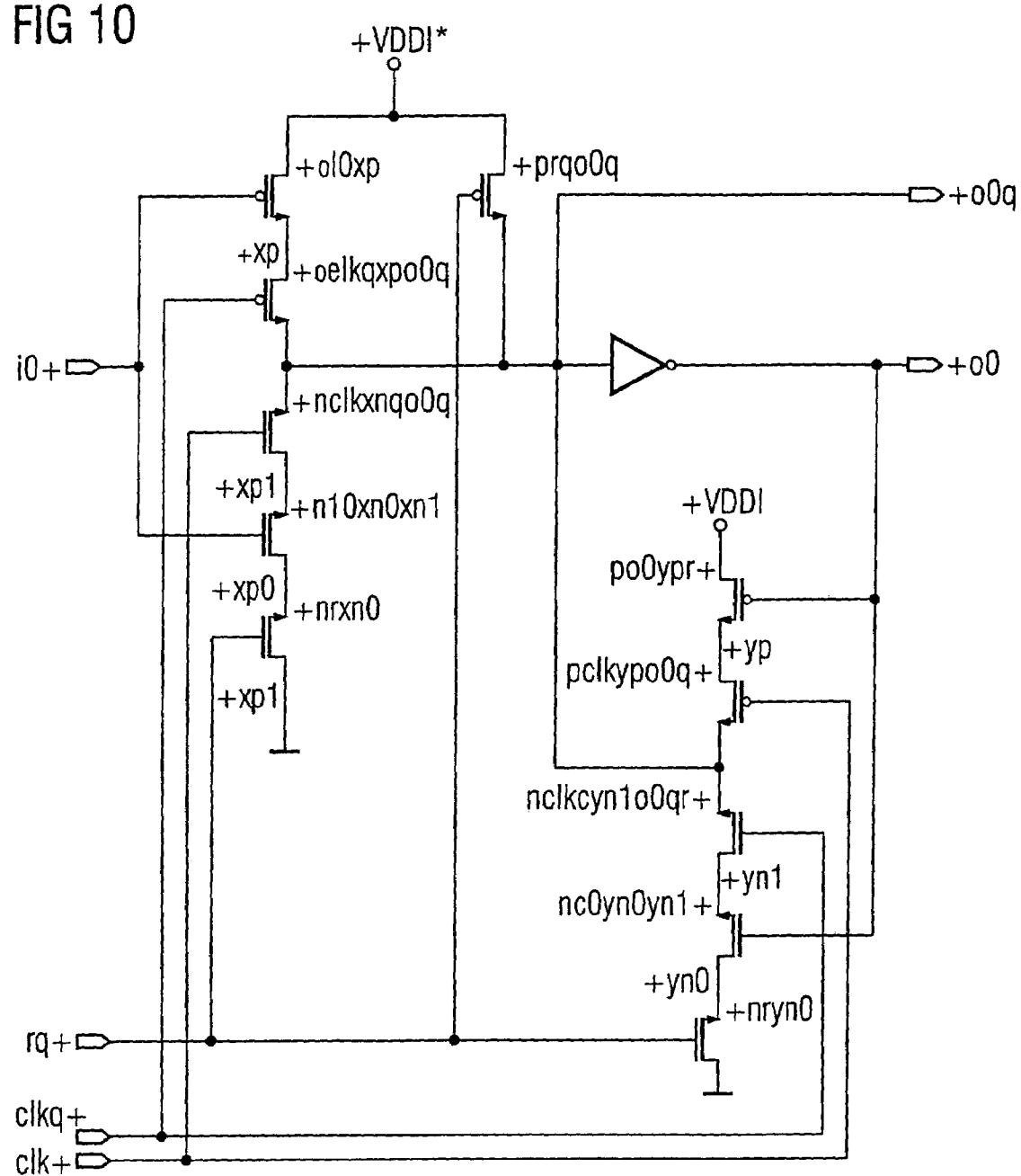
FIG. 10 shows a possible circuitry realization of the master latch from FIG. 6.
Figure 11:
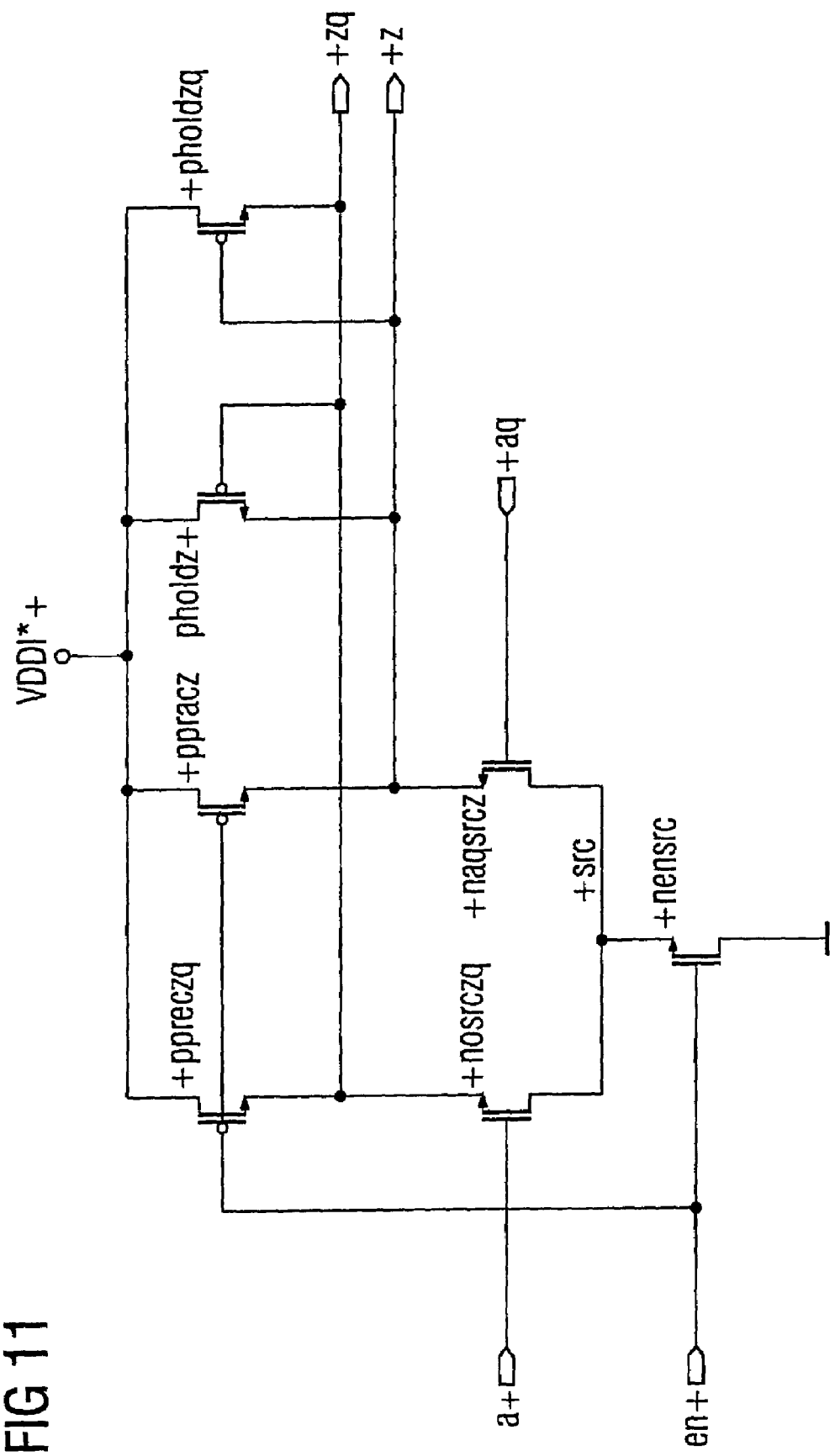
FIG. 11 shows a possible circuitry realization of the transformation circuit from FIG. 6.

FIGS. 4 to 11 specify circuit examples and signal profiles for the generation of the control signals shj<2:0> and of the drive signal PrShQ for the precharge unit VE. FIGS. 4 and 6 show circuits for transformation and input-side clocking-in of the control information, while FIGS. 5, 7 and 8 show the temporal behavior of the respectively relevant signals. Finally, FIGS. 9 to 11 illustrate parts of the circuit blocks specified in FIG. 6.

The table below defines, for the example considered above, the logical relationship between input-side control information sh_pos<2:0>, sh_dir and the sh4<2:0>, sh2<2:0>, sh1<2:0> to be generated therefrom.

| sh_pos<q> | sh_dir | Sh2$^q$<q> |
|---|---|---|
| 0 | 0 | 010 |
| 1 | 0 | 100 |
| 0 | 1 | 010 |
| 1 | 1 | 001 | q = 2, 1, 0

The signal sh_pos<2:0> specifies the binary coded absolute value for the number of bit positions by which shifting is to be effected. The signal sh_dir specifies the direction in which the shifting is to be effected. By way of example, the combinations s4<2:0>=001, s2<2:0>=010, s1<2:0>=001 result for sh_pos<2:0>=101 and sh_dir=1. This means that shifting is effected by five bit positions toward the right.

This logical relationship is realized by the decoding circuits DS1 (decode-sh4) and DS2 (decode sh21) bordered by broken lines.

The invention's particular temporal behaviour of the control signals shj<2:0> is achieved by:
  masking signals generated by the RS-flip-flops RSF1 (RS-Sh4EnN), RSF2 (RS-PrSh21Q) and RSF3 (RS-PrShQ),
  feedback of the signal PrShQ to the RS flip-flops RSF1 and RSF2, a feedback of the signal s4<2:0> to the decoding circuit DS2 and a feedback of the signals sh2<1>, sh1<1> to the RS flip-flop RSF3 (these relationships are illustrated by the "causality arrows" in FIG. 5), and
  the temporal behavior—specified in FIG. 5—of the dual-rail decoder inputs (sh_dir, sh_dir_q), sh-dir_n, sh_dir_qn) and (sh_pos<2:0>, sh_pos<2:0> ) and of the signal ShftEn (shift enable), the rising edge of which denotes the transition from phase T2 to phase T3, since it ends precharging of the data path and thus triggers the actual shift operation in the phases T3 and T4. Firstly, however, the signals sh2<1> and sh1<1> are switched off, from which the rising edge of the signal PrShQ is derived.

FIG. 6 also shows in addition to the clocking in of the primary control information sh_pos_i<2:0> and sh_dir_i in master latches ML and slave latches SL (FIG. 10) the transformation of primary single-rail to dual-rail signals (FIG. 11), and also the generation of the signal ShftEn already mentioned. The meaning thereof and its effect on the temporal behavior of the control signals shj<2:0> have already been specified in the explanation of FIG. 4.

The generation of the signal ShftEn will now be described below with reference to FIGS. 6 to 8.

ShftEn is present at the data output of the RS flip-flop RSF4 (RS-ShftEn) from FIG. 6, which is set by a low level (reference potential VSS) at its set input ShEnSq. ShftEn is then at supply potential VDD, that is to say the rising edge of ShftEn is derived from the falling edge of ShEnSq. The resetting of ShftEn to a low level follows from a low level at the reset input ShEnRq provided that ShEnSq is inactive. This is always ensured, as will become evident further below. A low level at ShftEn effects the precharging for the dual-rail decoder inputs (sh_dir, sh_dir_q), (sh_dir_qn, sh_dir_r) and (sh pos<2:0>, sh_pos<2:0>), which, for its part, results in the beginning of the phase T1: all the control signals shj<2:0>, j=4, 2, 1 of the logarithmic shifter become inactive: shj<2:0>=000. Thus, all the transistors N0 . . . N6 of the multiplexer cascade with the multiplexers Mux1, Mux2, Mux4 are turned off.

As can be seen from FIG. 8, ShEnRq is a momentary pulse which is derived from the rising edge of the externally supplied system clock clk by the circuit PlsGen bordered by broken lines in FIG. 6. In the case of a low level of the system reset rst, ShftEn is pulled to a low level independently of clk. In general, it holds true that in the case of an active system reset, the logarithmic shifter is in the precharge state or is put into the latter (in this respect, also see the system reset behavior of the circuit in FIG. 4).

The falling edge of ShEnSq (and the rising edge of ShftEn that follows from this) can be obtained in two different ways.

First of all, ShEnSq could be equated to the clock signal clk. This means that the phases T1 and T2 coincide with a time period during which clk is at a high level. By analogy, the phases T3 and T4 coincide with a time period while the clock signal clk is at a low level. The advantage of this procedure is its simplicity. The disadvantage is that less than the time period TCL is available for the actual shift operation during the phase T4, and that the duration of the phase T4 depends on the externally supplied system clock and, therefore, cannot be optimally adapted to the conditions within the logarithmic shifter.

This last is possible, however, if ShEnSq is derived from the condition that the precharge phase of the data path is concluded. This means that, in the phases T1 and T2, both the data inputs (a, aq) of the logarithmic shifter and the data outputs (z, zq) thereof have been or are precharged to a high potential level. By way of example, ShEnSq could be formed by means of a triple NAND gate, the first input of which indicates that the precharge operation of the slowest of the data inputs (a, aq) is concluded in T1 or T2, and the further inputs of which are the slowest of the data outputs (z, zq) in the data path. Moreover, with an inverter chain connected in series therewith or another means for delaying ShEnSq, it can be ensured that the precharging of the nodes lying between the multiplexer circuits of the cascades, which precharging commences later with respect to (z, zq), is commensurately taken into consideration.

The invention claimed is:

1. An integrated circuit comprising:
   at least two cascade-connected multiplexers each having:
   a plurality of data inputs;
   a data output, wherein each data input and each data output has two terminals for the application of a dual-rail signal wherein the data output of a multiplexer of the at least two cascade-connected multiplexers is connected to one of the data inputs of the multiplexer connected downstream, as a result of which a data path leading through the cascade is formed;
   a control input, wherein a signal present at the control input defines which of the data inputs is connected to the data output;
   at least one precharge unit, which is driven with a precharge unit control signal, wherein the at least one precharge unit is connected to the data output or at least one of the data inputs of one of the multiplexers to thereby bring the data outputs and/or data inputs of the multiplexers into a precharge state before execution of a shift operation, and the at least one precharge unit is connected between a supply potential terminal or a reference potential terminal and the data path of the integrated circuit; and
   a holding circuit coupled to the data path, wherein when a dual-rail signal is present at the data output of one of the multiplexers, the holding circuit connects the respective signal value to the supply potential terminal or the reference potential terminal,
   wherein a precharge signal is applied to the data inputs and data outputs in the data path of the multiplexer cascade before the execution of the shift operation.

2. The circuit as claimed in claim 1, wherein the at least one precharge unit is connected to the data output of the last multiplexer of the cascade.

3. The circuit as claimed in claim 1, wherein the at least one precharge unit is connected to one of the plurality of data inputs of the first multiplexer of the cascade.

4. The circuit as claimed in claim 1, wherein the at least one precharge unit is connected between the data output of one of the multiplexers and one of the data inputs of a multiplexer connected downstream.

5. The circuit as claimed in claim 2, wherein a precharge signal is applied to the data output of each of the multiplexers by the at least one precharge unit connected to the data output of the integrated circuit.

6. The circuit as claimed in claim 3, wherein a precharge signal is applied to the one of the data inputs of each of the multiplexers by the at least one precharge unit connected to the data input of the integrated circuit.

7. The circuit as claimed in claim 1, wherein the holding circuit is connected to the precharge unit.

8. The circuit as claimed in claim 1, wherein the holding circuit is arranged at a data output of the integrated circuit.

9. The circuit as claimed in claim 1, wherein the holding circuit has two cross-coupled transistors and is connected between a data output of the integrated circuit and the supply potential terminal or reference potential terminal.

10. The circuit as claimed in claim 1, wherein the integrated circuit is a logarithmic shifter.

11. The circuit as claimed in claim 1, further comprising:
    a drive circuit, which is connected to the multiplexers and the precharge unit,
    wherein the drive circuit performs temporal synchronization of multiplexer control signals and the precharge unit control signal.

12. The circuit as claimed in claim 1, wherein, for application of the precharge signal, in a first phase, multiplexer control signals are applied to all of the multiplexers of the cascade, so that no conductive connection exists between any of the data inputs and the data output of a respective multiplexer, and the precharge unit control signal is applied to the precharge unit, so that the section of the data path that is connected thereto is brought into a precharge state.

13. The circuit as claimed in claim 12, wherein, for application of the precharge signal, in a second phase, multiplexer control signals are applied to at least some of the multiplexers, so that a conductive connection of one of the data inputs to the data output of these multiplexers is produced in the case of these multiplexers as a result of which further sections of the data path are brought into a precharge state.

14. The circuit as claimed in claim 13, wherein, for application of the precharge signal in a third phase, multiplexer control signals are applied to all the multiplexers of the cascade, so that a conductive connection no longer exists between any of the data inputs and the data output of a respective multiplexer and a precharge unit control signal that deactivates the precharge unit is applied thereto.

15. The circuit as claimed in claim 14, wherein, after termination of the precharge phase, for the execution of the computation step, in the third phase, a multiplexer control signal required for the shift operation is applied to the first multiplexer of the cascade.

16. The circuit as claimed in claim 15, wherein, for the execution of the computation step, in a fourth phase, the multiplexer control signal required for the shift operation is applied to the further multiplexers of the cascade.

17. The circuit as claimed in claim 13, wherein the precharge unit is connected to the data output of the integrated circuit, and, in the second phase, multiplexer control signals are applied to all further multiplexers except the first multiplexer of the cascade, so that a conductive connection of one of the data inputs to the data output is produced for each of these further multiplexers.

18. The circuit as claimed in claim 17, wherein a precharge signal is applied to the connected data input of the first multiplexer of the cascade in the second phase by a precharge unit connected thereto.

19. The circuit as claimed in claim 13, wherein the precharge unit is connected to the data input of the integrated circuit, and, in the second phase, multiplexer control signals are applied to all further multiplexers, except the last multiplexer of the cascade, so that a conductive connection of the one of the data inputs to the data output is produce in each of these further multiplexers.

20. The circuit as claimed in claim 19, wherein a precharge signal is applied to the data output of the last multiplexer of the cascade in the second phase by the precharge unit, which is connected thereto.

21. The circuit as claimed in claim 13, wherein inner nodes of the multiplexer cascade which are formed by the connection of the data output of a multiplexer to one of the data inputs of the multiplexer connected downstream are precharged by precharge units arranged at one of the data inputs and at the data output of the integrated circuit.

22. An integrated circuit comprising:
at least two cascade-connected multiplexers each having:
a plurality of data inputs;
a data output, wherein each data input and each data output has two terminals for the application of a dual-rail signal wherein the data output of a multiplexer of the at least two cascade-connected multiplexers is connected to one of the data inputs of the multiplexer connected downstream, as a result of which a data path leading through the cascade is formed;
a control input, wherein a signal present at the control input defines which of the data inputs is connected to the data output; and
at least one precharge unit, which is driven with a precharge unit control signal, wherein the at least one precharge unit is connected to the data output or at least one of the data inputs of one of the multiplexers to thereby bring the data outputs and data inputs of the multiplexers into a precharge state before execution of a computation operation, wherein the precharge state is independent of inputted data,
wherein the computation operation is a shift operation.

* * * * *